United States Patent
Smith (12)

(10) Patent No.: US 9,218,129 B2
(45) Date of Patent: Dec. 22, 2015

(54) USER INTERFACE

(75) Inventor: Andrew W. D. Smith, Dundee (GB)

(73) Assignee: NCR Corporation, Duluth, GA (US)

( * ) Notice: Subject to any disclaimer, the term of this patent is extended or adjusted under 35 U.S.C. 154(b) by 196 days.

(21) Appl. No.: 13/220,058

(22) Filed: Aug. 29, 2011

(65) Prior Publication Data

US 2013/0050088 A1 Feb. 28, 2013

(51) Int. Cl.
*G06F 3/0489* (2013.01)
*G06F 3/0488* (2013.01)
*G07F 7/10* (2006.01)
*G07F 19/00* (2006.01)

(52) U.S. Cl.
CPC ........ *G06F 3/04895* (2013.01); *G06F 3/04886* (2013.01); *G07F 7/1033* (2013.01); *G07F 19/205* (2013.01)

(58) Field of Classification Search
CPC ..... G07F 19/205; G07F 7/1033; G07F 19/00; G07F 19/20; G06F 3/04886; G06F 3/04895; G06F 3/0489
USPC .................................................. 345/173–174
See application file for complete search history.

(56) References Cited

U.S. PATENT DOCUMENTS

| | | | | |
|---|---|---|---|---|
| 4,313,113 | A * | 1/1982 | Thornburg | 345/159 |
| 4,786,895 | A * | 11/1988 | Castaneda | 345/160 |
| 4,922,419 | A * | 5/1990 | Ohashi et al. | 705/43 |
| 5,412,189 | A * | 5/1995 | Cragun | 235/379 |
| 5,987,103 | A * | 11/1999 | Martino | 379/93.17 |
| 6,012,048 | A * | 1/2000 | Gustin et al. | 705/39 |
| 6,100,887 | A * | 8/2000 | Bormann et al. | 715/764 |
| 6,149,055 | A * | 11/2000 | Gatto | 235/379 |
| 6,624,803 | B1 * | 9/2003 | Vanderheiden et al. | 345/156 |
| 6,832,354 | B2 * | 12/2004 | Kawano et al. | 715/771 |
| 7,229,007 | B1 * | 6/2007 | Swaine et al. | 235/379 |
| 7,419,091 | B1 * | 9/2008 | Scanlon | 235/379 |
| 7,644,039 | B1 * | 1/2010 | Magee et al. | 705/43 |
| 2002/0001393 | A1 * | 1/2002 | Jones et al. | 382/100 |
| 2002/0156682 | A1 * | 10/2002 | DiPietro | 705/16 |
| 2003/0016211 | A1 * | 1/2003 | Woolley | 345/173 |
| 2003/0197055 | A1 * | 10/2003 | Ben-Aissa | 235/379 |
| 2004/0222295 | A1 * | 11/2004 | Magee et al. | 235/381 |
| 2005/0190083 | A1 * | 9/2005 | Tyneski et al. | 341/22 |
| 2006/0181515 | A1 * | 8/2006 | Fletcher et al. | 345/173 |
| 2006/0249568 | A1 * | 11/2006 | Scanlon | 235/379 |
| 2007/0008293 | A1 * | 1/2007 | Oldrey | 345/173 |
| 2007/0092243 | A1 * | 4/2007 | Allen et al. | 396/121 |
| 2008/0163082 | A1 * | 7/2008 | Rytivaara | 715/762 |
| 2009/0065573 | A1 * | 3/2009 | Potts et al. | 235/379 |

(Continued)

OTHER PUBLICATIONS

Kenny Tom, Progress Trackers in Web Design: Examples and Best Practices, Jan. 15, 2010, Smashing Magazine.*

(Continued)

*Primary Examiner* — Dwayne Bost
*Assistant Examiner* — Ivelisse Martinez Quiles
(74) *Attorney, Agent, or Firm* — Joseph P. Mehrle

(57) ABSTRACT

A user interface comprising: (i) a physical keypad comprising a plurality of keys, and (ii) a touch-sensitive display for presenting a screen. The screen comprises: (a) an image illustrating the physical keypad; and (b) a transaction option depicted on one of the keys of the physical keypad. A user is able to select the transaction option either by pressing the transaction option on the touch-sensitive display or by pressing a physical key corresponding to the key on which the transaction option is depicted.

16 Claims, 4 Drawing Sheets

(56) References Cited

U.S. PATENT DOCUMENTS

| | | | |
|---|---|---|---|
| 2009/0192786 A1* | 7/2009 | Assadollahi | 704/9 |
| 2009/0243897 A1* | 10/2009 | Davidson et al. | 341/22 |
| 2009/0292569 A1* | 11/2009 | Statland et al. | 705/7 |
| 2010/0079372 A1* | 4/2010 | Vanderheiden et al. | 345/157 |
| 2010/0088192 A1* | 4/2010 | Bowles et al. | 705/26 |
| 2010/0191603 A1* | 7/2010 | Herwig | 705/14.65 |
| 2010/0302169 A1* | 12/2010 | Pance et al. | 345/170 |
| 2011/0179372 A1* | 7/2011 | Moore et al. | 715/773 |
| 2012/0066100 A1* | 3/2012 | Sherman | 705/30 |
| 2012/0235912 A1* | 9/2012 | Laubach | 345/163 |

OTHER PUBLICATIONS

Kenny, Progress Trackers in Web Design: Examples and Best Practices, Jan. 15, 2010, Smashing Magazine.*

American Printing House for the Blind, Inc. and LevelStar, LLC., Icon and Braille Plus User Guide, Jun. 28, 2010.*

* cited by examiner

USER INTERFACE

FIELD OF INVENTION

The present invention relates to an improved user interface. In particular, though not exclusively, the invention relates to an improved user interface for a public access terminal.

BACKGROUND OF INVENTION

A public access terminal, such as an automated teller machine (ATM), allows a user to execute a transaction and/or to access information in an unassisted manner (that is, without requiring help from a human) and/or in an unattended environment (that is, an area that is not supervised by someone to ensure that the SSTs are not being misused) in a public environment.

Different users of public access terminals have different levels of physical ability. For example, some users have a visual impairment. This makes it difficult for those users to use a user interface that does not have tactile feedback, such as a touch-sensitive display.

To overcome this problem, vendors of public access terminals may provide audio feedback, for example, by providing a headphone socket in the public access terminal, into which a user may plug his/her personal headset. The audio feedback lists options presented on a screen currently displayed on the public access terminal. However, it is difficult to represent complex screens to users using audio only, because there may be a large number of options on a screen, and the user may forget which options are available by the time the end of the list of options has been reached.

It would be desirable to have an improved user interface that is easy to use and that provides a similar user experience to visually impaired users as to those users having sufficient vision to use a touch sensitive display.

SUMMARY OF INVENTION

Accordingly, the invention generally provides methods, systems, apparatus, and software for a user interface comprising: (i) a physical keypad, and (ii) a touch-sensitive display for presenting a screen, where the screen (a) depicts the physical keypad, and (b) includes a transaction option associated with one of the keys on the physical keypad, thereby enabling a user to select the transaction option either via the physical key or via the transaction option on the touch-sensitive display.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a user interface comprising: (i) a physical keypad comprising a plurality of keys, and (ii) a touch-sensitive display for presenting a screen, where the screen comprises: (a) an image illustrating the physical keypad; and (b) a transaction option depicted on one of the keys of the physical keypad; so that a user is able to select the transaction option either by pressing the transaction option on the touch-sensitive display or by pressing a physical key corresponding to the key on which the transaction option is depicted.

The screen may further comprise a navigation option depicted on another of the keys (a navigation key), so that selection of that navigation key (either on the physical keypad or via the touch-sensitive display) advances to the next transaction option, which replaces the transaction option depicted on the one of the keys.

The physical keypad may comprise a plurality of keys configured to indicate directions to the user. These directions may include up, down, left, and right. The keys may be spatially arranged to indicate the direction each key represents.

The plurality of keys may comprise diamond shapes (or square shapes oriented with their edges centrally).

The left and right keys may be used for navigating through a menu; for example, right key to display the next transaction option(s), left key to go back to the previous transaction option(s).

The up and down keys may be used for displaying transaction options.

The user interface may include an audio lead-through that announces the transaction option associated with the up key and the transaction option associated with the down key.

Once the user has selected a transaction (for example, by pressing the down key or by touching the down key area on the image rendered on the touch-sensitive display), the up and down keys may provide controls that increment and decrement (respectively) a transaction amount. The left key may continue to be used to revert to the previous state (in this example, the transaction option(s)); whereas, the right key may be used to select the transaction amount. The transaction amount may be displayed on the screen either to one side of, or superimposed on, an image of the keypad.

The physical keypad may include a raised portion on an upper surface of each of the keys. The raised portion may comprise a shape indicative of the direction represented by that key. For example, an up key may include a raised portion in the form of an upward arrow (that is, an arrow facing away from the user); a left key may include a raised portion in the form of a left-facing arrow (that is, an arrow facing to the left of the user as the user views the public access terminal).

The raised portions on the keypad may include a backlight so that they can be illuminated.

Each successive screen presented on the touch-sensitive display may include a visual and/or audible indication of the level of the current screen in the transaction, or a place in a sequence of transaction option screens occupied by the current transaction option screen.

The touch-sensitive display may present an image identical to the physical keypad, or similar to the physical keypad.

The touch-sensitive display may present a transaction option on an up key and another transaction option on a down key, and may indicate that a left key is used to return to a previous level in the transaction, and a right key is used to move to a next level in the transaction.

The term "screen" is used herein to denote the graphics, text, controls (such as menu options), and such like (essentially data and software), that are presented on a public access terminal display; the term "screen" as used herein does not refer to the hardware (that is, the display) that presents the graphics, text, controls, and such like.

It will now be appreciated that by virtue of this aspect a user of a public access terminal is able to execute a transaction using a touch-sensitive display, a physical keypad, or both. The user interface experience of each is very similar, thereby providing comparable interactive experiences for all users. The main difference between the two forms of interaction is that tactile feedback is provided when the physical keypad is used but not when the touch-sensitive display is used (unless an advanced touch-sensitive display with tactile feedback is provided on the public access terminal).

It will now also be appreciated that the user interface is easy for someone with a visual impairment to use because only a small number of transactions are presented on each screen, so the user only has to listen to a small number of choices spoken through an audio lead-through.

According to a second aspect there is provided a public access terminal including a user interface comprising: (i) a physical keypad comprising a plurality of keys, and (ii) a touch-sensitive display for presenting a screen, where the screen comprises: (a) an image illustrating the physical keypad; and (b) a transaction option depicted on one of the keys of the physical keypad; so that a user is able to select the transaction option either by pressing the transaction option on the touch-sensitive display or by pressing a physical key corresponding to the key on which the transaction option is depicted.

The public access terminal may further comprise a numeric keypad. The numeric keypad may comprise an encrypting keypad used for entering a personal identification number (PIN).

The public access terminal may comprises an automated teller machine (ATM), an information kiosk, a financial services centre, a bill payment kiosk, a lottery kiosk, a postal services machine, a check-in and/or check-out terminal such as those used in the retail, hotel, car rental, gaming, healthcare, and airline industries, and the like.

According to a third aspect there is provided a method of receiving transaction information from a user, the method comprising: presenting a screen depicting a physical keypad; including on the screen a transaction option associated with a key on the physical keypad; and receiving a transaction request from the user, where the transaction request is provided either by touching the transaction option key, or by pressing a key on the physical keypad corresponding to the transaction option key.

The method may comprise the further steps of: presenting a transaction amount screen depicting the physical keypad; presenting a transaction amount on the transaction amount screen; and including an amount increment option associated with another key on the physical keypad, and an amount decrement option associated with yet another key on the physical keypad.

The method may comprise the further steps of: including on the screen a forward navigation option associated with another key on the physical keypad; and including on the screen a backward navigation option associated with yet another key on the physical keypad.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
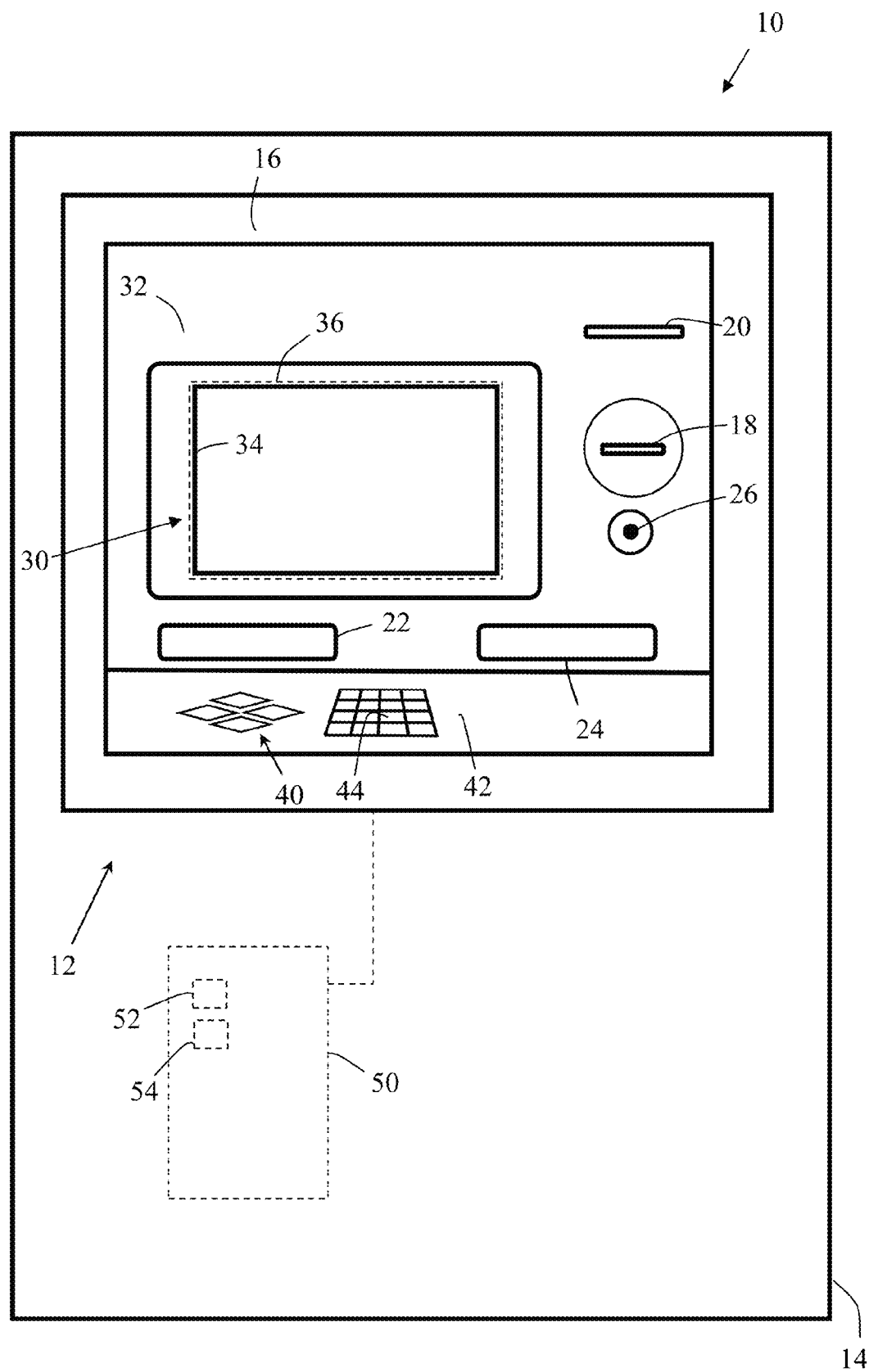
FIG. 1 is a pictorial front view of a public access terminal including a user interface according to one embodiment of the present invention.

Reference will now be made to FIG. 1, which is a schematic diagram of a public access terminal 10 (in the form of an ATM) including a user interface (shown generally by arrow 12) according to one embodiment of the present invention.

In addition to the user interface 12, the ATM 10 comprises a cabinet 14 on which is mounted a plastic fascia 16.

The fascia 16 provides apertures (or slots) aligning with internal devices (not shown), and defines: a card reader slot 18; a receipt printer slot 20; a deposit slot 22 (closed by a shutter when not being used for depositing media items); and a dispenser slot 24 (closed by a shutter when not being used for dispensing banknotes).

The fascia 16 also provides a headphone socket 26 into which a user can insert a headphone plug so that the user can hear audio lead-through guidance for a transaction at the ATM 10 through his/her personal headset.

A touch sensitive unit 30 is mounted on an upright portion 32 of the fascia 16 and comprises: a customer display 34 on which is mounted a touch sensitive panel 36 in overlapping relationship therewith so that the customer display 34 and the touch sensitive panel 36 are in registration.

A navigation keypad 40 is mounted on a generally flat shelf portion 42 of the ATM 10. An encrypting numeric keypad 44 (used for PIN entry) is also mounted on the shelf portion 42.

The ATM 10 includes various modules which are not illustrated. These modules include a cash dispenser, a depository, a card reader, a printer, (all four of which are aligned with their respective apertures in the fascia 16), and the like. The modules in the ATM 10 are controlled by a PC core controller module 50 (shown in broken line in FIG. 1).

The PC core controller 50 includes many conventional hardware computer devices, such as a motherboard, a display adapter, serial ports, a disk drive, an Ethernet controller, and the like. These conventional computer devices are not shown in detail. However, a processor 52 and associated memory 54 are illustrated in FIG. 1, in broken line. Those of skill in the art will appreciate that the processor 52 and memory 54 are coupled to the conventional computer devices listed above (and other conventional computer devices not listed specifically).

Figure 2:
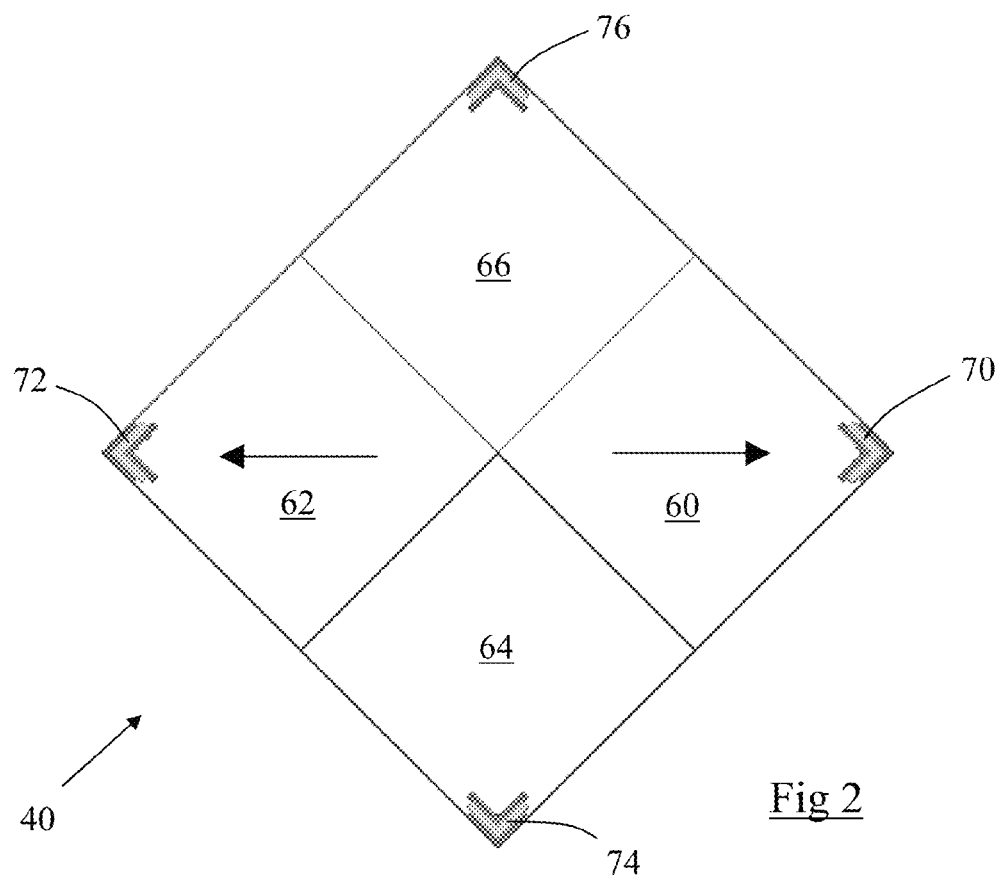
FIG. 2 is a pictorial diagram illustrating part of the user interface (a navigation keypad) of FIG. 1 in more detail.

The navigation keypad 40 will now be described in more detail with reference to FIG. 2, which is a pictorial diagram of the keypad 40. The keypad 40 is a physical keypad that comprises four keys 60,62,64,66, each in the shape of a diamond. Each key 60 to 66 can be individually actuated by a user, and depresses in response to pressure applied to an upper surface thereof.

The first key 60 is the right key, which is used to move to the next transaction option or options, or to the next level in a screen hierarchy, or to select a transaction amount.

The second key 62 is the left key, which is used to move to the previous transaction option or options, or the previous level in the screen hierarchy.

The third key 64 is the down key, which is used to select a transaction option associated therewith (described in more detail below) or to decrement a transaction amount.

The fourth key 66 is the up key, which is used to select a transaction option associated therewith (described in more detail below) or to increment a transaction amount.

Each of the four keys 60 to 66 includes a raised portion on an upper surface thereof that indicates the direction of that key. The first key 60 includes a right chevron 70 backlit with a green LED. The second key 62 includes a left chevron 72 backlit with a green LED. The third key 64 includes a down chevron 74 backlit with a green LED. The fourth key 66 includes an up chevron 76 backlit with a green LED.

These raised portions 70 to 76 enable a visually impaired user to ascertain by touch the direction of each key 60 to 66.

Figure 3:
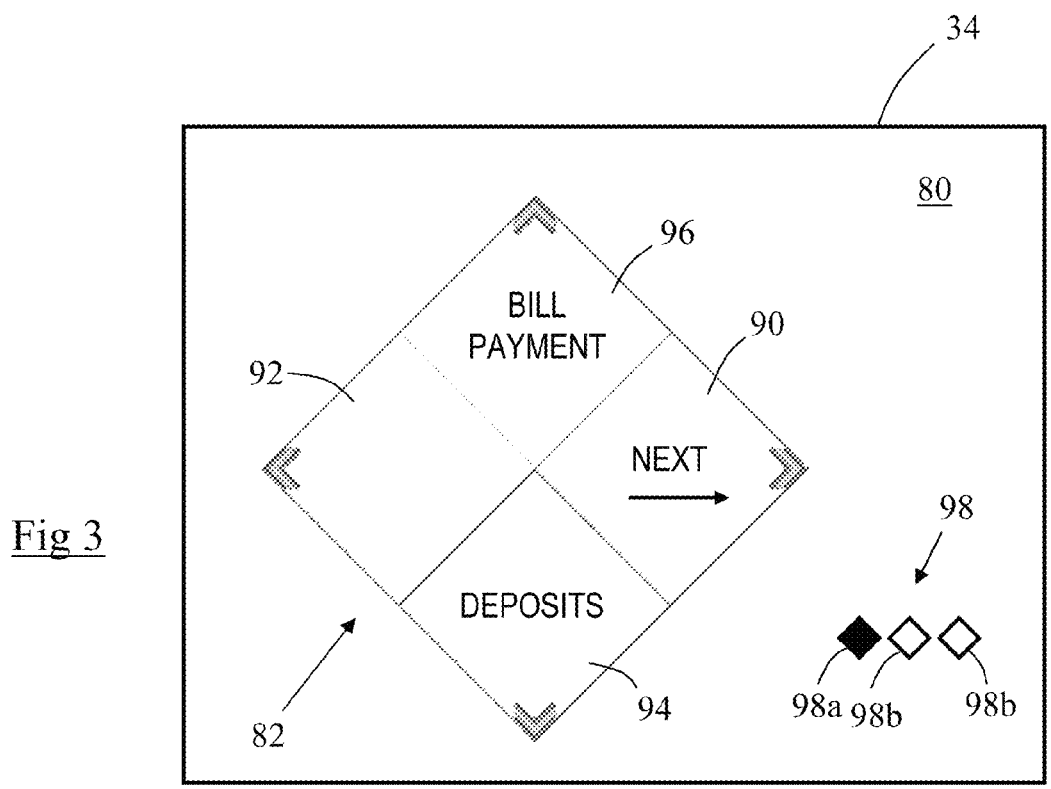
FIG. 3 is a pictorial diagram of a first transaction option screen presented on part (the display) of the user interface of FIG. 1.

Reference will now also be made to FIG. 3, which is a pictorial diagram of a first transaction option screen 80 presented on the customer display 34. This screen 80 would be presented once the user has provided identification (for example, by inserting an ATM card into the card reader slot 18) and then entered his/her PIN on the encrypting keypad 44.

The first transaction option screen 80 comprises an image 82 depicting the navigation keypad 40, including a representation (90 to 96 respectively) of each of the four keys 60 to 66.

The first key representation 90 (corresponding to the right key 60) includes the text "NEXT" and a forward arrow to indicate to users with visual capacity that the next set of transaction options can be displayed either by pressing this location on the touch sensitive panel 36 or by depressing the first physical key 60.

The second key representation 92 (corresponding to the left key 62) does not include any text because this option cannot be selected at this stage of the transaction.

The third key representation 94 (corresponding to the down key 64) includes the text "DEPOSITS". This indicates to a user with visual capacity that selecting the down key (either the down key representation 94 or the physical down key 64) will select a deposit transaction. If a visually impaired user has inserted a headphone into the headphone socket 26 then the audio lead-through plays a pre-recorded voice message stating that the down key corresponds to a deposit transaction.

The fourth key representation 96 (corresponding to the up key 66) includes the text "BILL PAYMENT". This indicates to a user with visual capacity that selecting the up key (either the up key representation 96 or the physical up key 66) will select a bill payment transaction. If a visually impaired user has inserted a headphone into the headphone socket 26 then the audio lead-through plays a pre-recorded voice message stating that the up key corresponds to a bill payment transaction.

The audio lead-through also states that to move to the next set of transaction options, the user should press the right key (either the right key representation 90 or the physical right key 60).

The first transaction option screen 80 also indicates what stage in the transaction option sequence the user is at by presenting a visual indication 98 comprising a sequence of three diamonds (because there are three transaction option screens, although only two will be described herein). Because this is the first screen in the sequence, the first diamond 98a is shaded and the other two diamonds are un-shaded.

Figure 4:
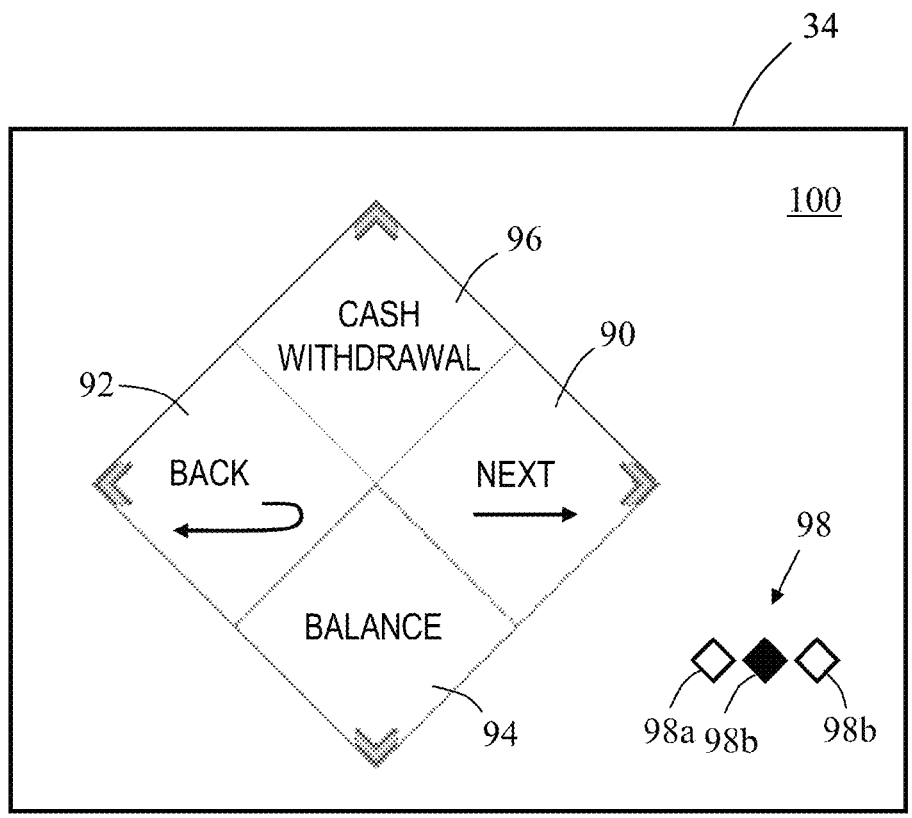
FIG. 4 is a pictorial diagram of a second transaction option screen presented on the display of the user interface of FIG. 1.

In this example, the user presses the physical right key 60, and the ATM 10 presents the second transaction option screen 100, as shown in FIG. 4.

The second transaction option screen 100 is very similar to the first transaction option screen 80. The main differences are as follows.

The second key representation 92 (corresponding to the left key 62) now includes the text "BACK". Selection of this option would return the user to screen 80.

The third key representation 94 (corresponding to the down key 64) now includes the text "BALANCE" instead of "DEPOSITS". This indicates to a user with visual capacity that selecting the down key will select a balance request transaction. If a visually impaired user has inserted a headphone into the headphone socket 26 then the audio lead-through plays a pre-recorded voice message stating that the down key corresponds to a balance request transaction.

The fourth key representation 96 (corresponding to the up key 66) includes the text "CASH WITHDRAWAL". This indicates to a user with visual capacity that selecting the up key (either the up key representation 96 or the physical up key 66) will select a cash withdrawal transaction. If a visually impaired user has inserted a headphone into the headphone socket 26 then the audio lead-through plays a pre-recorded voice message stating that the up key corresponds to a cash withdrawal transaction.

The other difference between screen 100 and screen 80 is that in screen 100 the second diamond 98b is shaded in the visual indication 98, and the first and third diamonds 98a,c are un-shaded.

Figure 5:
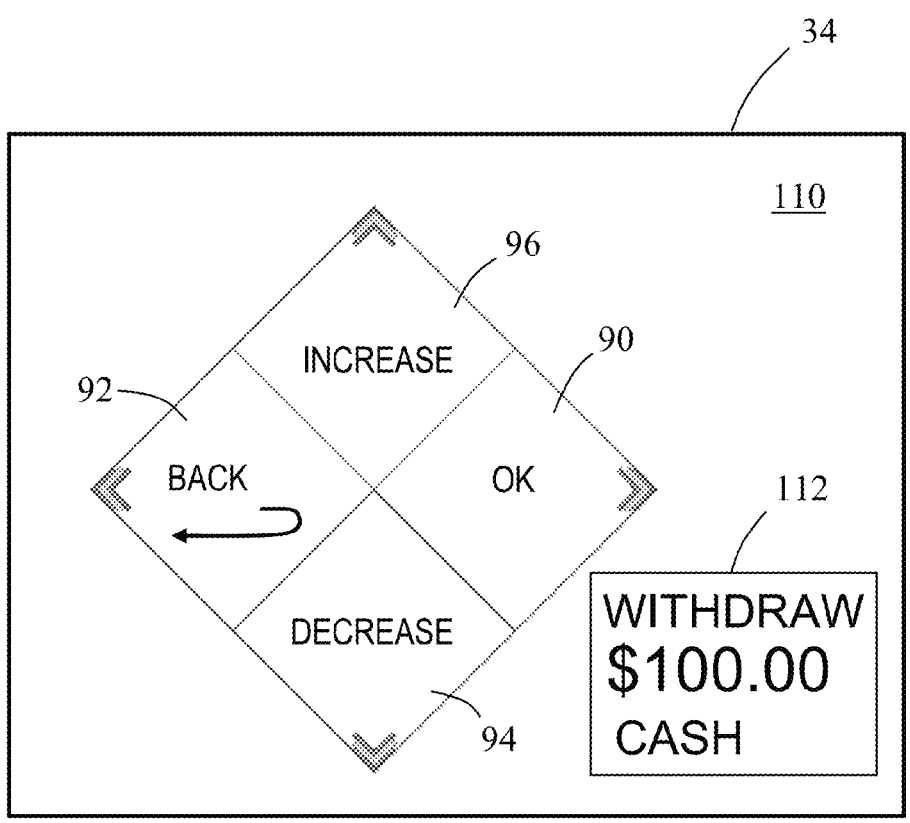
FIG. 5 is a pictorial diagram of a transaction amount screen for a withdrawal transaction presented on the display of the user interface of FIG. 1.

In this example, the user selects the cash withdrawal transaction option by pressing an area on the touch sensitive panel 36 overlying the fourth key representation 96. This causes the ATM 10 to present the next screen, which is the transaction amount screen 110, as illustrated in FIG. 5.

The transaction amount screen 110 is similar to the transaction option screens 80, 100.

In the transaction amount screen 110, the first key representation 90 (corresponding to the right key 60) includes the text "OK" to indicate to users with visual capacity that the currently displayed transaction option and transaction amount can be selected by pressing this key (either by pressing this location on the touch sensitive panel 36 or by depressing the first physical key 60).

The second key representation 92 (corresponding to the left key 62) is identical to the corresponding representation on screen 100 because it includes the text "BACK". Selection of this option would return the user to the second transaction option screen 100.

The third key representation 94 (corresponding to the down key 64) includes the text "DECREASE". This is because the function of this key has now changed from selecting a transaction option to decrementing the amount of a transaction. This text ("DECREASE") indicates to a user with visual capacity that selecting the down key (either the down key representation 94 or the physical down key 64) will decrement the amount of the transaction (which is displayed on transaction amount zone 102) by ten dollars (or whatever amount is preset)) each time the key is selected. The audio lead-through plays a pre-recorded voice message stating that each selection of the down key will decrease the transaction amount by ten dollars. The audio lead-through also states the currently displayed transaction amount, which corresponds to the amount shown in a transaction amount zone 112.

The fourth key representation 96 (corresponding to the up key 66) includes the text "INCREASE". This text ("INCREASE") indicates to a user with visual capacity that selecting the up key (either the up key representation 96 or the physical up key 66) will increment the amount of the transaction (which is displayed on transaction amount zone 112) by ten dollars each time the key is selected. The audio lead-through plays a pre-recorded voice message stating that each selection of the up key will increase the transaction amount by ten dollars. The audio lead-through also states the currently displayed transaction amount, which corresponds to the amount shown in the transaction amount zone 112.

Once the user is satisfied that the amount displayed matches the amount desired, then the user selects the OK option by pressing the right key (either the key representation 90 or the physical key 60).

The ATM 10 then authorizes and fulfils the transaction in a conventional manner.

Figure 6:
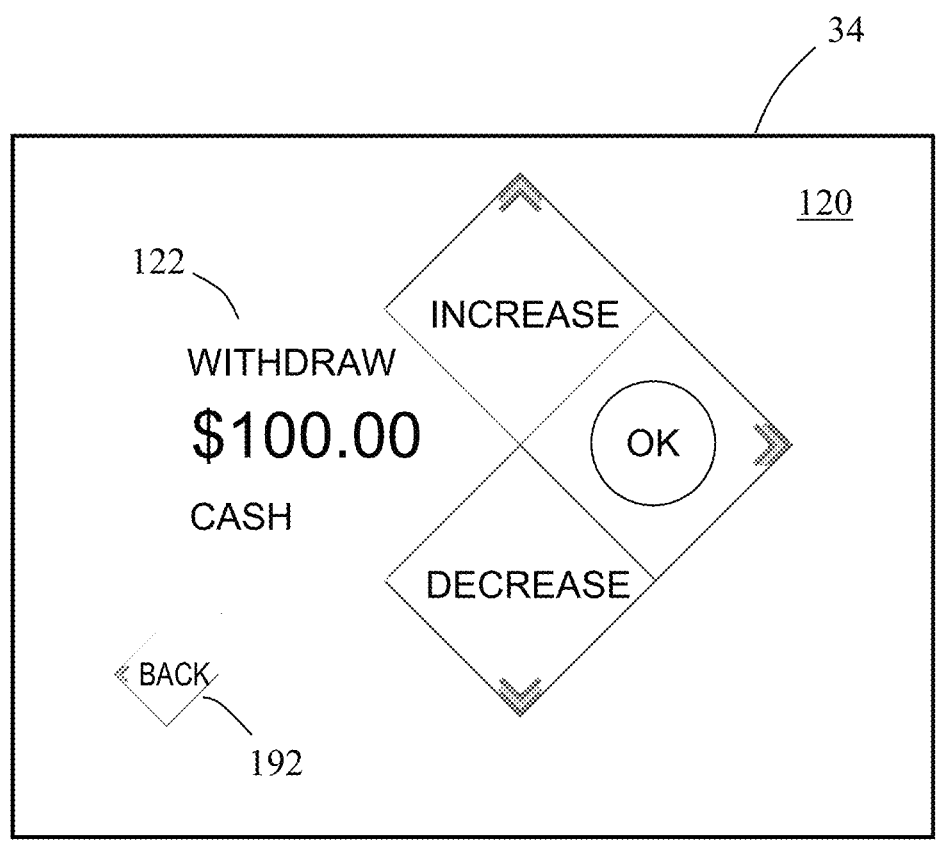
FIG. 6 is a pictorial diagram of an alternative transaction amount screen for a withdrawal transaction presented on the display of the user interface of FIG. 1.

An alternative transaction amount screen 120 is shown in FIG. 6, in which the second key representation 192 (corresponding to the left key 62) is displaced from its previous position, which is now occupied by a new transaction amount zone 122.

It should now be appreciated that these embodiments have the advantage that a user interface is provided in which transaction options are presented in a simple manner and can be selected by a user using either a touch-sensitive display or a physical keypad. The layout of the keypad is substantially reproduced as an image on the customer display so that a user can have a consistent interaction experience regardless of whether the touch-sensitive display or the physical keypad (or both) is used.

Various modifications may be made to the above described embodiment within the scope of the invention, for example, the shape of the navigation keypad may differ from that described above. The number of keys on the navigation keypad may be greater or fewer than the four keys described above. The location of the navigation keypad on the public access terminal may be different to that described above. The type of public access terminal may be different; in other words, it may not be an ATM. A user may use the encrypting keypad 44 to enter the transaction amount directly, rather than using the navigation keypad 40.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A public access transaction terminal user interface comprising:
    (i) a physical keypad comprising a plurality of keys including screen navigation keys, the plurality of keys being arranged in a layout, each screen navigation key backlit by a Light Emitting Diode (LED) and include a raised portion on that screen navigation key's upper surface, and each screen navigation key in a shape of a diamond, wherein each raised portion and each shape for each screen navigation key is adapted to assist a visually impaired user in ascertaining a direction associated with that screen navigation key, and wherein each screen navigation key is arranged with remaining screen navigation keys as a navigation keypad having four screen navigation keys, each screen navigation key abutting the remaining screen navigation keys, and wherein a first key of the four screen navigation keys when activated moves a transaction option presented on a particular screen to a next transaction option, and a second key of the four screen navigation keys when activated moves the transaction option presented on a particular screen to a previous transaction option, and a third key of the four screen navigation keys when activated selects the transaction option presented on the particular screen or decrements a transaction amount, and a fourth key of the for screen navigation keys when activated selects the transaction option presented on the particular screen or increments the transaction amount; and
    (ii) a touch-sensitive display for presenting a screen, where the screen comprises:
        (a) an image illustrating both the plurality of keys and the layout of the physical keypad; and
        (b) the transaction option depicted on the third or fourth key in the image of the physical keypad;
    both the physical keypad and the image on the touch-sensitive display being active at the same time so that a user is able to select the transaction option either by pressing the transaction option on the touch-sensitive display or by pressing a physical key from the plurality of keys of the physical keypad corresponding to the one key on which the transaction option is depicted.

2. A user interface according to claim 1, wherein the screen further comprises a navigation option depicted on another of the keys, so that selection of that navigation key advances to a screen presenting another transaction option, which replaces the transaction option depicted on the one of the keys.

3. A user interface according to claim 1, wherein the physical keypad comprises a plurality of keys configured to indicate directions to the user.

4. A user interface according to claim 3, wherein the plurality of keys comprise the directions up, down, left, and right.

5. A user interface according to claim 4, wherein the plurality of keys are spatially arranged to indicate a direction each key represents.

6. A user interface according to claim 4, wherein the left and right keys are used for navigating through a menu.

7. A user interface according to claim 4, wherein the up and down keys are used for displaying transaction options.

8. A user interface according to claim 1 further comprising:
    an audio source for playing a voice message informing a user which the physical key corresponds to the transaction option depicted.

9. A user interface according to claim 1, wherein the transaction option depicted on one of the keys includes text on the illustration of said one of the keys.

10. A user interface according to claim 1, wherein the physical keypad is a navigation keypad, and the user interface further comprises an encrypting numeric keypad.

11. A public access transaction terminal including a user interface comprising:
    (i) a physical keypad comprising a plurality of keys including screen navigation keys, the plurality of keys being arranged in a layout, each screen navigation key backlit by a Light Emitting Diode (LED) and include a raised portion on that screen navigation key's upper surface, and each screen navigation key in a shape of a diamond, wherein each raised portion and each shape for each screen navigation key is adapted to assist a visually impaired user in ascertaining a direction associated with that screen navigation key, and wherein each screen navigation key is arranged with remaining screen navigation keys as a navigation keypad having four screen navigation keys, each screen navigation key abutting the remaining screen navigation keys, and wherein a first key of the four screen navigation keys when activated moves a transaction option presented on a particular screen to a next transaction option, and a second key of the four screen navigation keys when activated moves the transaction option presented on a particular screen to a previous transaction option, and a third key of the four screen navigation keys when activated selects the transaction option presented on the particular screen or decrements a transaction amount, and a fourth key of the for screen navigation keys when activated selects the transaction option presented on the particular screen or increments the transaction amount, and (ii) a touch-sensitive display for presenting a screen, where the screen comprises:
  (a) an image illustrating both the plurality of keys and the layout of the physical keypad;
  (b) the transaction option depicted on the third or fourth key in the image of the physical keypad;
both the physical keypad and the image on the touch-sensitive display being active at the same time so that a user is able to select the transaction option either by pressing the transaction option on the touch-sensitive display or by pressing a physical key corresponding to the one key on which the transaction option is depicted; and
(iii) a payment mechanism.

12. A public access terminal according to claim 11, wherein the terminal further comprises a numeric keypad separate from the physical keypad.

13. A public access terminal according to claim 11, wherein the terminal comprises an automated teller machine.

14. A method of receiving transaction information from a user to perform a transaction at a public access transaction terminal, the method comprising:
  presenting a screen depicting an image of both keys and layout of a physical keypad, the physical keypad including screen navigation keys, and each screen navigation key backlit by a Light Emitting Diode (LED) and include a raised portion on that screen navigation key's upper surface, and each screen navigation key in a shape of a diamond, wherein each raised portion and each shape for each screen navigation key is adapted to assist a visually impaired user in ascertaining a direction associated with that screen navigation key, and wherein each screen navigation key is arranged with remaining screen navigation keys as a navigation keypad having four screen navigation keys, each screen navigation key abutting the remaining screen navigation keys, and wherein a first key of the four screen navigation keys when activated moves a transaction option presented on a particular screen to a next transaction option, and a second key of the four screen navigation keys when activated moves the transaction option presented on a particular screen to a previous transaction option, and a third key of the four screen navigation keys when activated selects the transaction option presented on the particular screen or decrements a transaction amount, and a fourth key of the for screen navigation keys when activated selects the transaction option presented on the particular screen or increments the transaction amount;
  including on the screen the transaction option associated with a transaction option key as the third or fourth navigation key in the image and a corresponding key of the physical keypad where both the physical keypad and the image thereof are active at the same time; and
  receiving a transaction request from the user, where the transaction request is provided either by touching the transaction option key, or by pressing the corresponding key on the physical keypad.

15. A method according to claim 14, wherein the method comprises the further steps of:
  presenting a transaction amount screen depicting the physical keypad;
  presenting a transaction amount on the transaction amount screen; and
  including an amount increment option associated with another key on the physical keypad, and an amount decrement option associated with yet another key on the physical keypad.

16. A method according to claim 14, wherein the method comprises the further steps of:
  including on the screen a forward navigation option associated with another key on the physical keypad; and
  including on the screen a backward navigation option associated with yet another key on the physical keypad.

* * * * *